W. A. TURBAYNE.
ELECTRICAL SYSTEM OF DISTRIBUTION.
APPLICATION FILED OCT. 27, 1910.
1,131,174.
Patented Mar. 9, 1915.
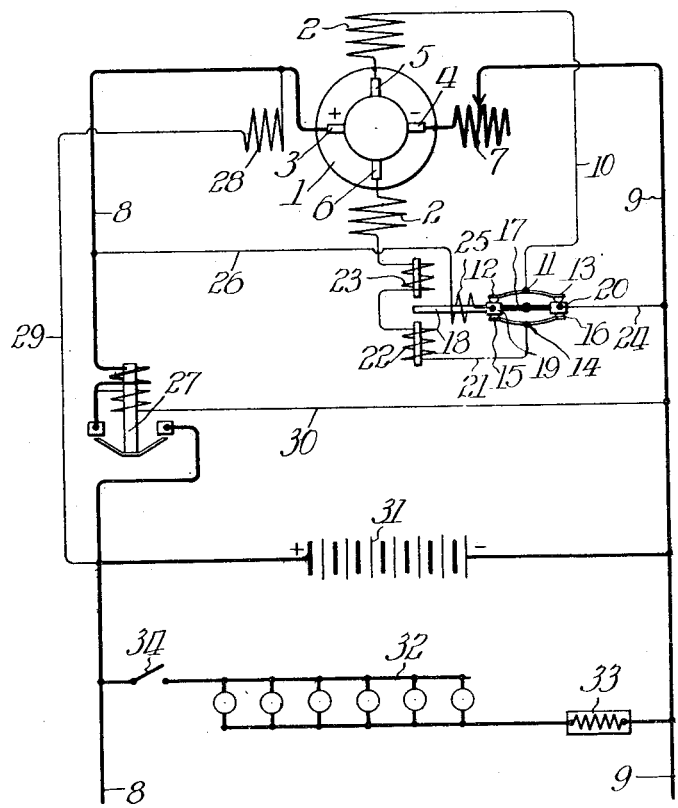
Witnesses:
Robert N. Weir
Geo. B. Jones.
Inventor:
William A. Turbayne
By Edwin B. W. Towey Jr.
Atty.

UNITED STATES PATENT OFFICE.

WILLIAM A. TURBAYNE, OF BUFFALO, NEW YORK, ASSIGNOR, BY MESNE ASSIGNMENTS, TO CENTRAL TRUST COMPANY OF NEW YORK, TRUSTEE, A CORPORATION OF NEW YORK.

ELECTRICAL SYSTEM OF DISTRIBUTION.

1,131,174.      Specification of Letters Patent.      Patented Mar. 9, 1915.

Application filed October 27, 1910. Serial No. 589,377.

*To all whom it may concern:*

Be it known that I, WILLIAM A. TURBAYNE, a citizen of the United States, residing at Buffalo, in the county of Erie and State of New York, have invented new and useful Improvements in Electrical Systems of Distribution, of which the following is a full, clear, concise, and exact description, reference being had to the accompanying drawing, forming a part of this specification.

My invention relates to an electrical system of distribution and to the control and regulation of the main generator of such a system.

One of the objects of the invention is to provide means whereby the correct polarity of the main generator is maintained upon reversal in the direction of rotation of the armature.

Another object of the invention is to so control the strength of the generator field that the output remains substantially constant under wide fluctuations in speed.

While a system having the general features outlined above, is adapted for a number of uses, I have devised the system illustrated in the accompanying drawings with particular reference to car lighting service in which the generator is subjected to excessive speed fluctuations and where it is essential that the generator maintain the same polarity in order that the storage battery, which is customarily included in such a system, may be properly charged.

Although it is apparent that a variety of instrumentalities may be designed or combined to produce the desired regulation, I have illustrated in the accompanying drawings, only one embodiment of the main features of my invention which embodiment, however, has various practical advantages.

In the system illustrated, the main generator 1 has shunt field windings 2, 2, main brushes 3, 4, and auxiliary brushes 5 and 6, spaced 90 electrical degrees from the main brushes. From the main brushes, conductors lead off through coil 7, hereinafter described, to the main circuit indicated at 8 and 9. The auxiliary brushes 5 and 6 connect the field coils 2 through the armature.

The field coils are so connected with the main conductors 8 and 9, that current from said conductors may be directed through said coils in either direction, depending on the operation of a pole changing device hereinafter described. A conductor 10 leads from one of the field coils 2 and is connected to a conducting member 11, having opposite contacts 12 and 13. A corresponding member 14 is provided with contacts 15 and 16. Between the four contacts referred to, there is pivoted an insulating member 17, having an extension 18 of magnetic material, said insulating member carrying contact members 19 and 20, which contact members are adapted to coöperate with the four contact members described, in a manner more fully pointed out hereinafter. From the lower connecting member 14 there extends conductor 21 connected with coils 22 and 23, which are connected in turn with the other field coil 2. The movable contact 20 is connected with conductor 9 by an intermediate conductor 24, and the opposite contact 19 is connected with coil 25 surrounding the magnetic extension 18, which coil connects through conductor 26, with the other main conductor 8.

An automatic switch 27 is also illustrated and may be of any well known type. A high resistance coil 28 is shown, connected across the gaps of the automatic switch 27 by means of a conductor 29. This coil 28 is displaced from the main field coil windings 2, 90 electrical degrees. Conductor 30 is connected across the mains 8 and 9 and includes one of the coils of the automatic switch 27, as will be apparent from the drawing.

I have also illustrated a storage battery 31, connected across the mains 8 and 9, and the usual lighting circuit 32, having any suitable means for controlling the voltage impressed thereon, as indicated diagrammatically at 33, and provided further with any suitable switch 34.

The system as illustrated in the diagram, represents the conditions when the car, which is equipped with said system, is at rest, whereupon it will be apparent that the lamp load may be carried by the storage battery if desired, by simply closing the connecting switch. The high resistance coil 28 is subjected at this time to full battery voltage and current flows from the battery through a circuit including conductor 29, coil 28, the armature winding included between brushes 3 and 4, which at this time develops no E. M. F., coil 7 and conductor 9, thence to the opposite terminal of the battery 31. Under these circumstances, when the generator armature commences to rotate slowly, a small current will be caused to circulate through the field coils 2 and through the circuit including conductors 10, 11, contacts 12, 13, 19, 20, 15, 16, conductor 14 and coils 22, 23. This current is generated owing to the fact that coil 28 is displaced 90 electrical degrees from the field coils 2 and therefore sets up a magnetic flux of fixed polarity which will develop an E. M. F. across the auxiliary brushes 5 and 6 in a direction depending on the direction of rotation, but which will produce no E. M. F. across the main brushes 3 and 4. This exciting current through the field coils will in turn develop an E. M. F. across the main brushes 3 and 4 so that a current will circulate through conductor 26, coil 25 and through the pole changing device and conductor 24, the result being that at a low rate of rotation, the energization of coil 25 will be sufficient to operate the pivoted member 17 in one direction or the other, depending on the polarity of the coöperating coils 22, 23, whereupon the pressure of the movable contacts 19 and 20 on the proper adjacent fixed contacts, and the electrical contact established thereby, is such that the pole changing device as a whole directs the current from the mains 8 and 9 through the shunt coils 2 in such a direction that the E. M. F. developed by the main brushes is added to that developed by the auxiliary brushes, so that both become effective in building up very quickly, the voltage of the generator as a whole. It will be apparent that as the coil 28 is always excited in one direction, the reversal of rotation of the armature will change the polarity of the brushes 5 and 6 so that the coils 22 and 23 will also reverse and coöperate with the coil 25, which is of fixed polarity, to always maintain the proper field circuit connections for the altered direction of rotation. After the actuation of the pole changing device, the generator operates as a true shunt machine, being assisted somewhat by the voltage developed across the auxiliary brushes, so that upon increased speed of rotation, the increased voltage eventually is sufficient to cause the closing of the automatic switch 27 which connects the generator with the battery and lamp circuit. As soon as the automatic switch closes, the coil 28 is eliminated as an exciting element so that the machine now operates purely as a shunt generator, and a negligible voltage will be developed across the auxiliary brushes. When, however, current is delivered through the main brushes 3 and 4 to the external circuit, this current circulating in the armature winding will develop a magnetic flux in line with these brushes and at right angles to the main flux developed by field windings 2, the resultant flux being thereby distorted in the direction of rotation. The flux component, however, effective upon brushes 5 and 6, will now develop an E. M. F. across these brushes, acting in a direction opposite to that formerly resulting by action of the coil 28, so that a counter E. M. F. will be included in the main field circuit acting to weaken the effective excitation upon increase of working armature current, so that regardless of the speed of rotation of the machine, this working current cannot exceed a certain value.

The winding 7 in series with the external circuit, may be provided if desired, having the same axis of magnetization as the working armature current but opposed thereto, and by altering the value of this winding as by changing the effective number of turns in a well known manner, the desired generator output may be altered at will.

The drawing, which is diagrammatic, shows a two-pole machine with the main and auxiliary brushes actually displaced 90 degrees angularly, but the commercial machine may be provided with any practicable number of poles as long as the auxiliary brushes maintain the 90 electrical degrees space relation as described. It will be further apparent that the invention is not to be limited to the particular arrangement of instrumentalities selected for the purpose of illustration, as various changes and rearrangements may be effected without departing from the spirit of the invention.

What I claim as my invention and desire to secure by Letters Patent of the United States is:—

1. A generator having field coils and an exciting coil displaced from the axes of said field coils, a source of current and connections whereby said exciting coil may be connected through the armature of the generator across said source.

2. A generator provided with field coils and with an exciting coil spaced 90 electrical degrees from one of said coils, a source of current, and connections whereby said exciting coil may be connected through the armature of the generator across said source.

3. A generator having a plurality of field coils and an exciting coil located between two consecutive coils, spaced ninety electrical degrees from each, a source of current and connections whereby said exciting coil may be connected through the armature of the generator across said source.

4. A generator having a plurality of main brushes, a plurality of field coils, and a plurality of auxiliary brushes, said auxiliary brushes serving to connect two of said field coils through the armature, a source of current, and an exciting coil connected through said main brushes across said external source to cause a difference of potential across said auxiliary brushes.

5. A generator having a plurality of main brushes, a plurality of field coils, and a plurality of auxiliary brushes, each pair of auxiliary brushes serving to connect two of said field coils through the armature, an exciting coil of constant polarity arranged to induce a current in two of said connected field coils in a direction depending on the direction of rotation of the armature, whereby the proper polarity of said field coils is established, and a pole changing device actuated by the exciting current and by the current from the main brushes, whereby the voltage of the exciting current is added to that of the main field energizing current to build up the field strength rapidly.

6. In an electrical system of distribution, a generator, field windings and auxiliary brushes therefor, a battery, a work circuit, a switch controlling the circuit between the generator and the battery and work circuit, an auxiliary exciting coil connected across the battery around said switch, a circuit including the field windings of the generator, the auxiliary brushes and the armature coils, a second switch adapted to insert the generator in the latter circuit, and means for actuating each of said switches responsively to given electrical conditions of the generator.

7. In an electrical system of distribution, a generator having field coils and having main and auxiliary brushes, an auxiliary field coil associated with said generator, a separate source of supply exciting said coil, an exciting circuit including the field coils of the generator and said auxiliary brushes, a switch adapted to connect the generator in series in said circuit with said main brushes in either of two relatively reversed relations to said auxiliary brushes, and co-acting coils connected with said generator and exciting circuit and arranged to determine the actuation and direction of movement of said switch.

8. In an electrical system of distribution, a generator having main field coils and an exciting field coil, a battery, a work circuit, a regulating circuit controlling the current in the field coils of said generator, said exciting coil acting to build up the electromotive force of said regulating circuit, and means for varying the connection of said circuit and said generator for aiding said building up effect.

9. In an electrical system of distribution, a generator having field coils and a set of auxiliary brushes displaced 90 electrical degrees from the main brushes, a work circuit, a battery, a regulating circuit including the generator field coils and said auxiliary brushes, and means governed responsively to a given electrical condition of the generator and in accordance with the direction of current in the regulating circuit for adding the electromotive force of said generator to the said circuit.

10. In an electrical system of distribution, a generator driven at variable speed, and having field coils and auxiliary brushes, said field coils being connected across the armature by said auxiliary brushes, an auxiliary circuit, said field coils, armature and brushes being included in said auxiliary circuit, and means for causing said auxiliary circuit to act as an exciting circuit for said generator to build up its field, the brushes for said circuit being arranged at substantially right angles to the flux set up by the armature current, whereby said circuit will act to cut down the field strength of said generator as its output tends to increase above certain desired limits.

11. In combination, a generator adapted to be driven in reverse directions, said generator having field coils, auxiliary brushes and an exciting coil, an auxiliary source of electromotive force, said auxiliary source including said exciting coil, an auxiliary circuit including said auxiliary brushes and the field coils of said generator, the axis of said exciting coil being arranged at substantially right angles to said auxiliary brushes, whereby said auxiliary source may cause said field coils to excite said generator in a direction depending on the direction of rotation so that said generator will produce an electromotive force at its brushes always in the same direction irrespective of its direction of rotation, and for causing said auxiliary electromotive force to act to cut down the excitation of the generator as its output tends to increase above certain desired limits.

12. In combination, a generator provided with a pair of main brushes, a pair of auxiliary brushes, field coils connected in local circuit through the armature of said generator by means of said auxiliary brushes, an exciting coil of constant polarity angularly displaced from said auxiliary brushes, whereby said exciting coil will set up an E. M. F. across said auxiliary brushes depending upon the direction of rotation of said armature, and means depending upon the direction of said E. M. F. for opening said local circuit and connecting said field coils across the main brushes in the proper direction to cause the E. M. F. of the main brushes to act with said exciting coil in energizing said field coils.

13. In combination, a generator provided with main brushes, a plurality of auxiliary brushes, field coils connected in local circuit through said auxiliary brushes, an exciting coil angularly displaced with relation to said auxiliary brushes, said coils being energized from an external source, whereby an E. M. F. in either direction may be set up across said auxiliary brushes, and a polarized relay responding to the direction of current through said field coils to connect said field coils across said main brushes in the proper direction to cause current from said main brushes to augment current from said auxiliary brushes in energizing said field coils.

14. In an electrical system of distribution, a generator provided with an armature subject to reversals in direction of rotation, a pair of main brushes, main leads therefrom, a storage battery connected across said leads, an automatic switch between said battery and armature, auxiliary brushes, field coils connected in local circuit through said auxiliary brushes, and an exciting coil angularly displaced from said auxiliary brushes, said coil being connected across the contacts of said switch, whereby said coil is subjected to the battery polarity, said coil serving to set up an E. M. F. across said auxiliary brushes depending upon the direction of rotation of said armature, whereby the polarity of said generator is maintained constant regardless of the direction of rotation.

15. In an electrical system of distribution, a generator provided with an armature subject to reversals in direction of rotation, a pair of main brushes, main leads therefrom, a storage battery connected across said leads, an automatic switch between said battery and armature, auxiliary brushes, field coils connected in local circuit through said auxiliary brushes, an exciting coil angularly displaced from said auxiliary brushes, said coil being connected across the contacts of said switch, whereby said coil is subjected to the battery polarity, said coil serving to set up an E. M. F. across said auxiliary brushes depending upon the direction of rotation of said armature, whereby the polarity of said generator is maintained constant regardless of the direction of rotation, and an automatic switch responding to the direction of E. M. F. in said field coils for opening said local circuit and connecting said field across the main brushes in the proper direction to cause said exciting coil and main brushes to act together to energize said field coils.

16. In an electrical system of distribution, a variable speed generator provided with an armature subject to reversals in direction of rotation, a pair of main brushes, main leads therefrom, a storage battery connected across said leads, an automatic switch between said battery and armature, auxiliary brushes, field coils connected in local circuit through said auxiliary brushes, an exciting coil angularly displaced from said auxiliary brushes, said coil being connected across the contacts of said switch, whereby said coil is subjected to the battery polarity, said coil serving to set up an E. M. F. across said auxiliary brushes depending upon the direction of rotation of said armature, whereby the polarity of said generator is maintained constant regardless of the direction of rotation, and an automatic switch responding to the direction of E. M. F. in said field coils for opening said local circuit and connecting said field across the main brushes in the proper direction to cause said exciting coil and main brushes to act together to energize said field coils, the armature current between said main brushes serving upon closure of said main automatic switch, to develop a C. E. M. F. across said auxiliary brushes, increasing with increase in current, whereby the output of said generator is maintained substantially constant.

In witness whereof, I have hereunto subscribed my name in the presence of two witnesses.

WILLIAM A. TURBAYNE.

Witnesses:
A. O. HIESTER,
HERTHA GLAWATZ.